(12) United States Patent
Suzuki et al.

(10) Patent No.: US 11,824,748 B2
(45) Date of Patent: Nov. 21, 2023

(54) COMMUNICATION APPARATUS AND RANGING METHOD

(71) Applicant: NIPPON TELEGRAPH AND TELEPHONE CORPORATION, Tokyo (JP)

(72) Inventors: Takahiro Suzuki, Musashino (JP); Sang-Yuep Kim, Musashino (JP); Junichi Kani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 388 days.

(21) Appl. No.: 17/287,082

(22) PCT Filed: Oct. 2, 2019

(86) PCT No.: PCT/JP2019/038910
§ 371 (c)(1),
(2) Date: Apr. 20, 2021

(87) PCT Pub. No.: WO2020/085022
PCT Pub. Date: Apr. 30, 2020

(65) Prior Publication Data
US 2021/0392064 A1    Dec. 16, 2021

(30) Foreign Application Priority Data
Oct. 25, 2018    (JP) .................... 2018-201257

(51) Int. Cl.
*H04L 43/0864*    (2022.01)
(52) U.S. Cl.
CPC ................. *H04L 43/0864* (2013.01)
(58) Field of Classification Search
CPC ..... H04L 43/0864; H04L 69/40; H04L 43/12; H04L 12/28
See application file for complete search history.

(56) References Cited

U.S. PATENT DOCUMENTS

| 2009/0019178 | A1* | 1/2009 | Melnyk | H04N 21/6582 709/233 |
| 2014/0294379 | A1* | 10/2014 | L G | H04B 10/25 398/28 |
| 2021/0360587 | A1* | 11/2021 | Speidel | H04L 5/0044 |

OTHER PUBLICATIONS

IEEE Computer Society, Part 3: Carrier Sense Multiple Access with Collision Detection (CSMA/CD) Access Method and Physical Layer Specifications, IEEE Standard for Information technology—Telecommunications and information exchange between systems—Local and metropolitan area networks—Specific requirements, 2009.

* cited by examiner

*Primary Examiner* — Hashim S Bhatti
(74) *Attorney, Agent, or Firm* — Harness, Dickey & Pierce, P.L.C.

(57) ABSTRACT

Provided is a communication device including: a transmission timing calculation unit configured to calculate a transmission timing of a first frame using the number of transmitted bits from a predetermined timing to transmission of the first frame and a throughput; a transmission unit configured to transmit the first frame to an external device at the transmission timing; a reception unit configured to receive a second frame from the external device in response to the first frame; a reception timing calculation unit configured to calculate a reception timing of the second frame using the number of received bits from a predetermined timing to reception of the second frame by the reception unit and a throughput; and a round trip time calculation unit configured to calculate a round trip time using a processing time required by the external device from the reception of the first frame to the transmission of the second frame, the transmission timing, and the reception timing.

3 Claims, 7 Drawing Sheets

COMMUNICATION APPARATUS AND RANGING METHOD

CROSS-REFERENCE TO RELATED APPLICATIONS

This application is a 371 U.S. National Phase of International Application No. PCT/JP2019/038910 filed on Oct. 2, 2019, which claims priority to Japanese Application No. 2018-201257 filed on Oct. 25, 2018. The entire disclosures of the above applications are incorporated herein by reference.

TECHNICAL FIELD

The present invention relates to a communication device and a ranging method.

BACKGROUND ART

Recently, a software-defined network (SDN) and a network function virtualization (NFV) have attracted attention in the field of networks, and there have been intensive efforts to improve flexibility of devices by configuring network devices using general-purpose hardware and software. Applications of SDN/NFV have also been examined in relation to optical access systems, and implementation of an optical line terminal (OLT; subscriber line terminal device) using software has been examined. Upper layer processing functions of the OLT include ranging, which is measuring a transmission time between the OLT and an optical network unit (ONU; subscriber line terminating device) (see Non Patent Literature 1, for example). However, the ranging requires highly precise time measurement in the order of nanoseconds (ns), and this makes implementation using software difficult.

CITATION LIST

Non Patent Literature

Non Patent Literature 1: "IEEE Standard for Information technology-Telecommunications and information exchange between systems-Local and metropolitan area networks-Specific requirements Part 3: Carrier Sense Multiple Access with Collision Detection (CSMA/CD) Access Method and Physical Layer Specifications', IEEE Std802.3av-2009, IEEE Computer Society, 2009

SUMMARY OF THE INVENTION

Technical Problem

In a passive optical network (PON) system, a plurality of ONUs are connected to one OLT, and economization is realized by a plurality of terminals under the ONUs sharing one optical fiber. In the PON system, a multi-point control protocol (MPCP) function is implemented in order to avoid collision of uplink signals. In the MPCP, a round trip time (RTT) that is transmission delay of each of the plurality of ONUs connected to the OLT is determined, and a transmission time of the uplink signal of the ONU is determined based on differences in the transmission delays. Ranging is performed to measure the RTT for each of the ONUs.

FIG. 6 is a diagram illustrating a ranging method. In ranging, a GATE frame for which the OLT sets a current clock time T1 is created and transmitted to the ONUs first. Each of the ONUs that has received the GATE frame appends a clock time T4, which is obtained by adding a time T3 required for processing to the clock time T1, to REPORT frame and transmits the REPORT frame to the OLT. The OLT receives the REPORT frame at a clock time T2, calculates T2−T4=T2−T1−T3, and measures the RTT.

FIG. 7 is a functional block diagram illustrating a configuration of the OLT configured to perform the ranging. A higher layer processing unit of the OLT acquires the current clock time T1 and generates a GATE frame to which the clock time T1 is appended.

A physical layer processing unit performs coding processing on the GATE frame, and an IF board (data transfer unit) transmits the coded GATE frame to the ONUs. The IF board of the OLT receives the REPORT frames transmitted from the ONUs, and the physical layer processing unit performs decoding processing on the received frame signals. The higher layer processing unit acquires the current clock time T2 and calculates RTTs (=T2−T4) using the clock time T4 indicated by clock time information appended to the received REPORT frames and the acquired clock time T2.

In a related art, the functions of the higher layer processing unit and the physical layer processing unit are realized through implementation of hardware such as an application specific integrated circuit (ASIC). Because the hardware can perform time measurement for the clock times T1 and T2 with high precision, the RTT calculation can be realized by these functional blocks implemented by the hardware. Hardware of the 10 Gigabit Ethernet (registered trademark) Passive Optical Network (10G-EPON) standard measures time using a counter configured to perform one count every 16 ns.

However, in a case in which the OLT is implemented using software, acquisition of the clock time in the order of nanoseconds is considered unachievable using a central processing unit (CPU) or a graphics processing unit (GPU). Acquisition of the clock time by the CPU is in the order of microseconds (μs) at best. Moreover, in the software processing, there tends to be fluctuation in the processing time for frame generation and physical layer processing, and thus acquisition of highly precise RTTS is considered unachievable.

In view of the aforementioned circumstances, an object of the present invention is to provide a communication device and a ranging method capable of implementing ranging processing using software.

Means for Solving the Problem

According to an aspect of the present invention, there is provided a communication device including: a transmission timing calculation unit configured to calculate a transmission timing of a first frame using the number of transmitted bits from a predetermined timing to transmission of the first frame and a throughput of the communication device itself; a transmission unit configured to transmit the first frame to an external device at the transmission timing; a reception unit configured to receive a second frame from the external device in response to the first frame transmitted by the transmission unit; a reception timing calculation unit configured to calculate a reception timing of the second frame using the number of received bits from a predetermined timing to reception of the second frame by the reception unit and the throughput; and a round trip time calculation unit configured to calculate a round trip time of the external device using a processing time required by the external device from the reception of the first frame to the transmission of the second frame, the transmission timing, and the reception timing.

According to an aspect of the present invention, there is provided a communication device including: a processor; and an interface circuit configured to transfer data output from the processor to an external device at a predetermined cycle and transfer data received from the external device at the cycle to the processor, wherein the processor includes a transmission timing calculation unit configured to calculate a transmission timing of a first frame using the number of iterations of the cycle from a predetermined timing to transmission of the first frame, a frame generation unit configured to generate the first frame and output the first frame to the interface circuit, a buffer configured to store the data received by the interface circuit at the cycle, a reception timing calculation unit configured to calculate a reception timing of a second frame using the number of iterations of the cycle from the predetermined timing to reception of the second frame by the interface circuit, the second frame being transmitted from the external device in response to the first frame, and a deviation from a position of a beginning of the cycle at which the second frame is received to a storing position of the second frame in the buffer, and a round trip time calculation unit configured to calculate a round trip time of the external device using a processing time required by the external device from the reception of the first frame to the transmission of the second frame, the transmission timing, and the reception timing.

An aspect of the present invention is the aforementioned communication device, in which the communication device is a subscriber line terminal device.

According to an aspect of the present invention, there is provided a communication device including: a processor; and an interface circuit configured to transfer data received from an external device at a predetermined cycle to the processor and transfer data output from the processor to the external device at the cycle; wherein the processor includes a buffer configured to store the data received by the interface circuit at the cycle, a processing time calculation unit configured to calculate a processing time from reception of a first frame to transmission of a second frame using the number of iterations of the cycle from a predetermined timing to reception of the first frame by the interface circuit, a deviation from a position of a beginning of the cycle at which the first frame is received to a storing position of the first frame in the buffer, and the number of iterations of the cycle from the predetermined timing to transmission of the second frame, and a frame generation unit configured to generate the second frame in response to the reception of the first frame and set the processing time or a transmission timing of the second frame by adding the processing time to a transmission timing of the first frame, which has been read from the first frame, to output the second frame to the interface circuit.

An aspect of the present invention is the aforementioned communication device, in which the communication device is a subscriber line terminating device.

According to an aspect of the present invention, there is provided a ranging method including: calculating a transmission timing of a first frame using the number of transmitted bits from a predetermined timing to transmission of the first frame and a throughput of the communication device itself; transmitting the first frame to an external device at the transmission timing; receiving a second frame from the external device in response to the first frame transmitted in the transmitting of the first frame; calculating a reception timing of the second frame using the number of received bits from a predetermined timing to reception of the second frame in the receiving of the second frame and the throughput; and calculating a round trip time of the external device using a processing time required by the external device from the reception of the first frame to the transmission of the second frame, the transmission timing, and the reception timing.

According to an aspect of the present invention, there is provided a ranging method including: by an interface circuit, transferring data output from a processor to an external device at a predetermined cycle and transferring data received from the external device at the cycle to the processor; and by the processor, calculating a transmission timing of a first frame using the number of iterations of the cycle from a predetermined timing to transmission of the first frame; generating the first frame and outputting the first frame to the interface circuit; storing the data received by the interface circuit in a buffer at the cycle; calculating a reception timing of a second frame using the number of iterations of the cycle from the predetermined timing to reception of the second frame by the interface circuit, the second frame being transmitted from the external device in response to the first frame, and a deviation from a position of a beginning of the cycle at which the second frame is received to a storing position of the second frame in the buffer; and calculating a round trip time of the external device using a processing time required by the external device from the reception of the first frame to the transmission of the second frame, the transmission timing, and the reception timing.

According to an aspect of the present invention, there is provided a ranging method including: by an interface circuit, transferring data received from an external device at a predetermined cycle to a processor and transferring data output from the processor to the external device at the cycle; and by the processor, storing the data received by the interface circuit in a buffer at the cycle; calculating a processing time from reception of a first frame to transmission of a second frame using the number of iterations of the cycle from a predetermined timing to reception of the first frame by the interface circuit, a deviation from a position of a beginning of the cycle at which the first frame is received to a storing position of the first frame in the buffer, and the number of iterations of the cycle from the predetermined timing to the transmission of the second frame; and generating the second frame in response to the reception of the first frame and setting the processing time or a transmission timing of the second frame by adding the processing time to a transmission timing of the first frame, which has been read from the first frame, to output the second frame to the interface circuit.

Effects of the Invention

According to the present invention, it is possible to implement ranging processing using software.

DESCRIPTION OF EMBODIMENTS

Hereinafter, embodiments of the present invention will be described in detail with reference to the drawings.

First, a configuration and processing of an OLT configured to perform ranging processing using software will be described. In this embodiment, a data transfer unit of the OLT is configured of hardware while a higher layer processing unit and a physical layer processing unit are implemented by software. The data transfer unit periodically performs data transfer in a time period in which downlink communication is performed and periodically performs data reception in a time period in which uplink communication is performed. The OLT calculates a transmission time and a reception clock time of a frame that is currently being processed using the number of transferred bits, the number of times transfer is performed, and a throughput, by functions of the higher layer processing unit and the physical layer processing unit realized by software. In this manner, it is possible to acquire clock time information that is not affected by fluctuation of the processing time of the physical layer processing.

According to this embodiment, it is possible to implement the ranging function using software. In addition, it is possible to realize various standards using common general-purpose hardware by implementing functional units other than the data transfer unit of the OLT using software.

Figure 1:
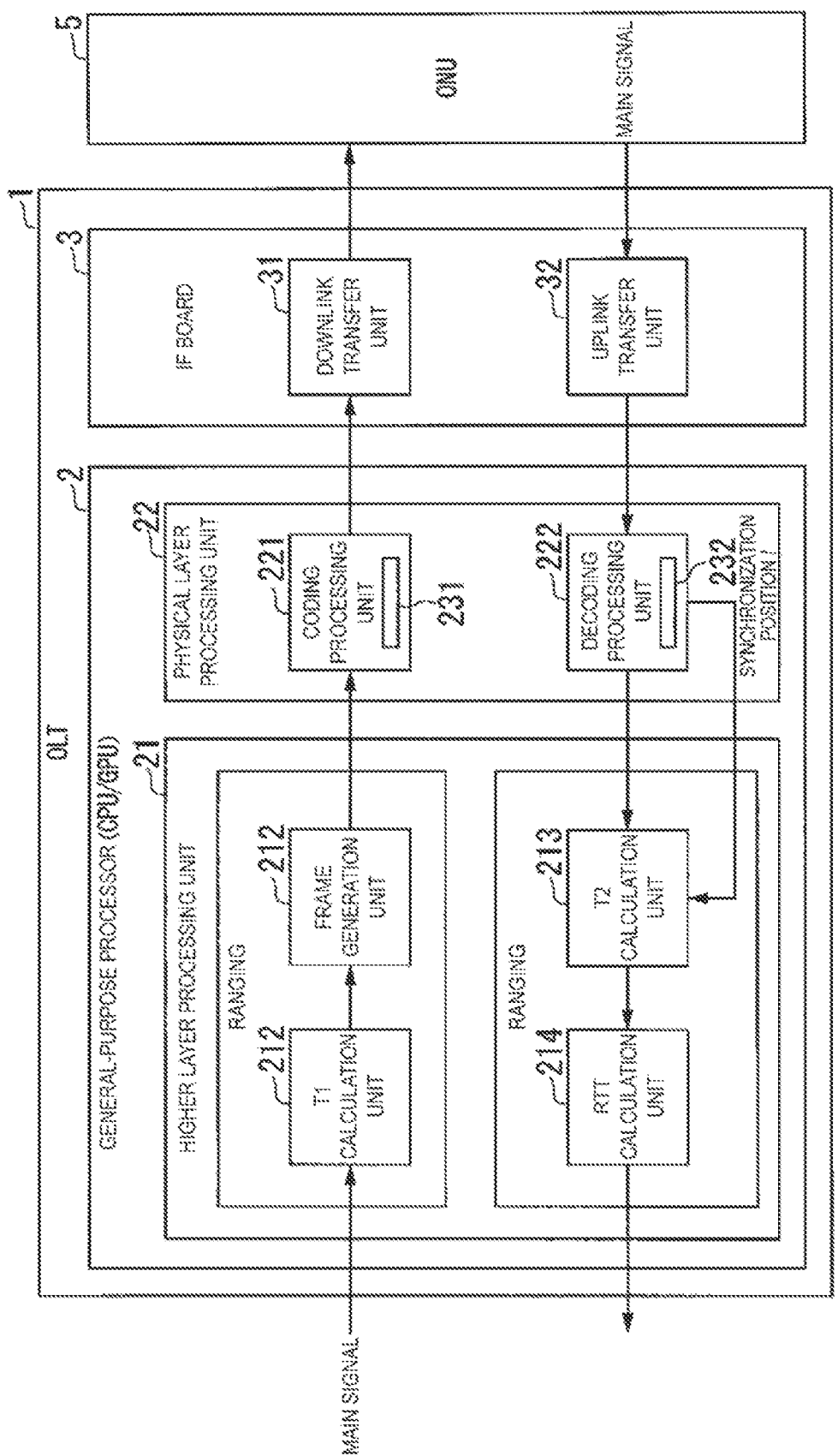
FIG. 1 is a functional block diagram of an OLT according to an embodiment of the present invention.

FIG. 1 is a functional block diagram illustrating a configuration of an OLT 1 according to this embodiment. In a PON system, one or more ONUs 5 are connected to one OLT 1. The drawing illustrates only one ONU 5. As illustrated in the drawing, the OLT 1 includes a general-purpose processor 2 and an IF board 3.

The general-purpose processor 2 is a CPU, a GPU, or the like. The general-purpose processor 2 realizes the functions of the higher layer processing unit 21 and the physical layer processing unit 22 using software.

The higher layer processing unit 21 has a T1 calculation unit 211, a frame generation unit 212, a T2 calculation unit 213, and an RTT calculation unit 214. The T1 calculation unit 211 calculates a transmission clock time T1 of a GATE frame. The frame generation unit 212 generates a GATE frame to which the clock time T1 is appended. The T2 calculation unit 213 calculates a reception clock time T2 of a REPORT frame in the OLT 1. The RTT calculation unit 214 calculates an RTT using the transmission clock time T1 of the GATE frame, the reception clock time T2 of the REPORT frame, and the processing time T3 in the ONU 5. The RTT calculation unit 214 reads the processing time T3 from the REPORT frame or reads the clock time T4, which is obtained by adding the processing time T3 to the clock time T1, and uses it to calculate the RTT.

The physical layer processing unit 22 has a coding processing unit 221 and a decoding processing unit 222. The coding processing unit 221 performs coding processing on a downlink signal frame generated by the frame generation unit 212 and outputs the downlink signal frame to the IF board 3. The coding processing unit 221 has a buffer 231 configured to temporarily store the downlink signal frame. Note that the buffer 231 may be included outside the coding processing unit 221. The decoding processing unit 222 performs decoding processing on uplink signal data transferred from the IF board 3. The decoding processing unit 222 has a buffer 232 configured to temporarily store data that is a target of decoding. Note that the buffer 232 may be included outside the decoding processing unit 222.

The IF board 3 is a hardware data communication unit. The IF board 3 has a downlink transfer unit 31 and an uplink transfer unit 32. The downlink transfer unit 31 converts the downlink signal frame generated by the coding processing unit 221 from an electric signal to an optical signal and periodically transfers the optical signal to the ONU 5 in a time period in which downlink communication is performed. The uplink transfer unit 32 periodically receives an uplink optical signal, converts the optical signal to an electric signal, and transfers the electric signal to the decoding processing unit 222 in a time period in which the ONU 5 performs uplink communication.

Figure 2:
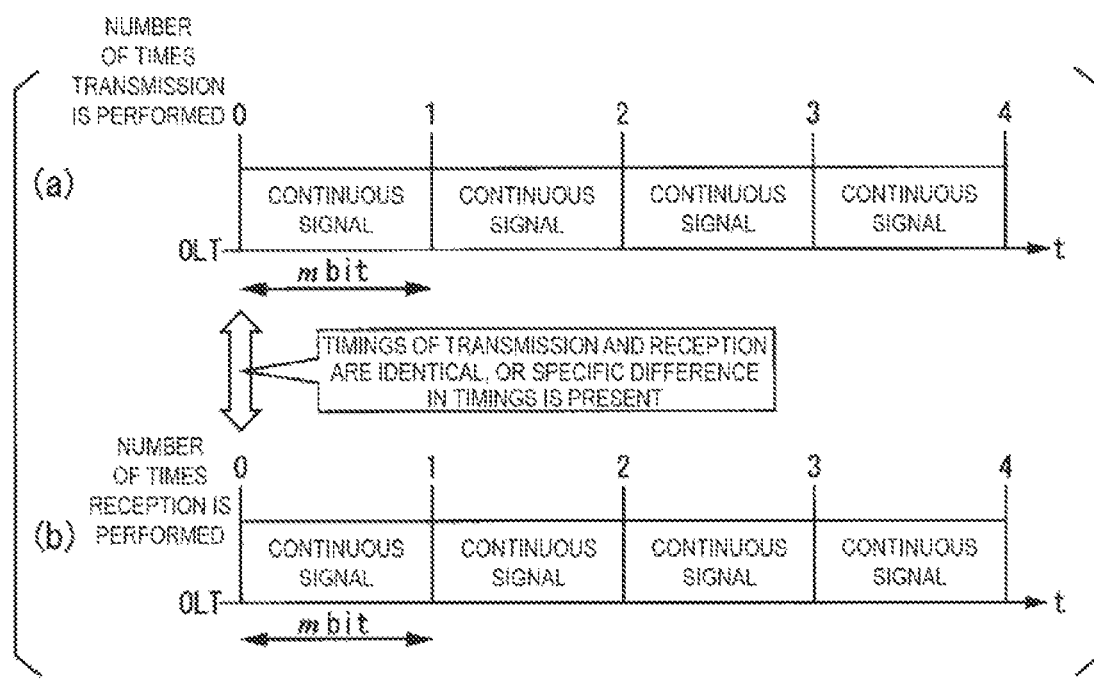
FIG. 2 is a diagram illustrating a transfer method through an IF board according to the embodiment.

FIG. 2 is a diagram illustrating a transfer method performed by the IF board 3. As illustrated in FIG. 2(a), the downlink transfer unit 31 periodically and continuously transfers a downlink signal (continuous signal) that is m-bit data generated by the general-purpose processor 2. Also, the uplink transfer unit 32 periodically and continuously receives an uplink signal (continuous signal) that is m-bit data at the same timing as the transmission of the downlink signal from the downlink transfer unit 31 or with a specific time difference.

Figure 3:
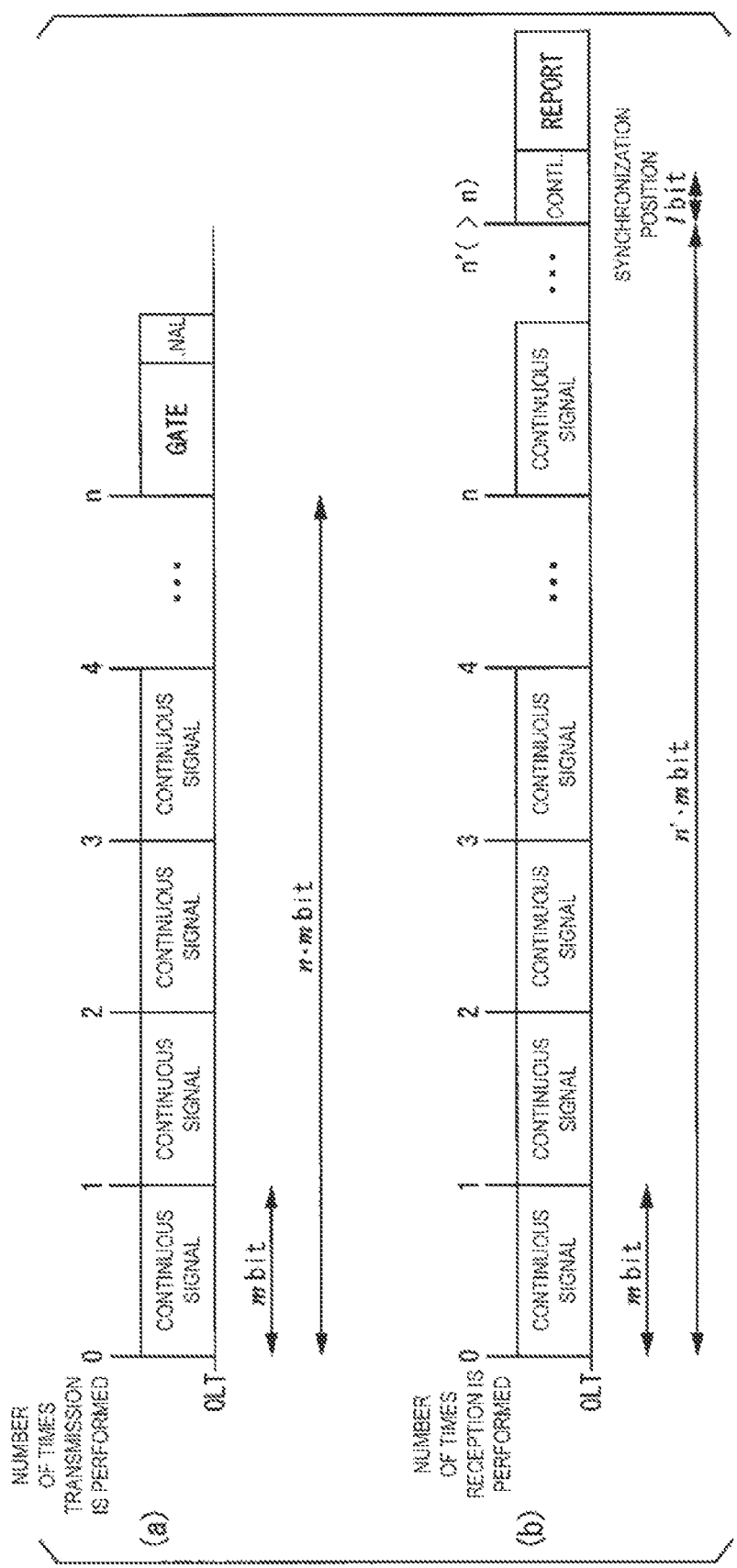
FIG. 3 is a diagram illustrating a state of a buffer in the OLT according to the embodiment.

FIG. 3 is a diagram illustrating states of the buffers 231 and 232 when the OLT 1 transmits and receives a PON frame. FIG. 3(a) illustrates a downlink signal stored in the buffer 231, and FIG. 3(b) illustrates an uplink signal stored in the buffer 232. Note that data of a new downlink signal and an uplink signal (continuous signals) are successively written in the buffers 231 and 232, respectively. As illustrated in FIG. 2, the IF board 3 periodically and continuously transfers data of the m-bit uplink signal or downlink signal generated by the general-purpose processor 2. When the reference clock time (timing) is defined as zero, an iteration of a cycle that begins at the clock time zero is defined as 0th transfer, and a GATE frame for ranging is transmitted at the time of transfer at the n-th iteration of the cycle from the reference time, the T1 calculation unit 211 calculates the transmission clock time T1 of the GATE frame according to Equation (1) below.

[Math. 1]

$$T1 = \frac{n \cdot m}{\text{Throughput}} \quad (1)$$

Note that Throughput is a throughput of the system (between the OLT 1 and the ONU 5). Also, n×m is the number of transferred bits from the reference clock time to the transfer of the GATE frame. After the transmission clock time T1 is calculated, the frame generation unit 212 generates the GATE frame in which the transmission clock time T1 is set and outputs the GATE frame to the coding processing unit 221 such that the generated GATE frame is transmitted at the beginning of the transfer in the n-th iteration of the cycle. The coding processing unit 221 performs coding processing on the generated GATE frame and outputs the GATE frame to the downlink transfer unit 31. The downlink transfer unit 31 converts the coded GATE frame into an optical signal and transmits the optical signal to the ONU 5 at the beginning of the n-th iteration of the transfer cycle.

Although the processing time of the CPU/GPU used for the general-purpose processor 2 may have fluctuation, the frame transmission clock time is constantly maintained in consideration of the fluctuation. In a case in which the transfer cycle is 3 ms, and the processing completion timing of the CPU/GPU fluctuates by about ±0.1 ms from 6 ms, for example, the worst processing completion timing is 6.1 ms. Thus, the general-purpose processor 2 fixes the transfer timing of the GATE frame to the third iteration of the cycle (9 ms limitation time) with a margin.

In this manner, it is possible to assume that the transmission processing of the GATE frame performed by the general-purpose processor 2 (CPU/GPU) has been completed before the transfer at the n-th iteration of the cycle.

The uplink transfer unit 32 of the OLT 1 receives a REPORT frame of an uplink signal from the ONU 5 in response to the GATE frame and then transfers data of the continuous signal including the GATE frame to the general-purpose processor 2 at a timing of an n'-th (n<n') iteration of the transfer cycle from the reference clock time. Even in a case in which the ONU 5 transmits the REPORT frame at the timing of the beginning of the transfer cycle, a deviation from the beginning of the transfer cycle occurs at the time of reception by the OLT 1 due to a propagation delay of the fiber. Because all frames are affected by the same propagation delay in a case in which they pass through the same transmission path, the same deviation occurs. The decoding processing unit 222 writes the data transferred from the uplink transfer unit 32 in the buffer 232, performs the decoding processing thereon, and detects the frame. In a case in which the beginning of the REPORT frame is stored in the 1-th bit from the position of the beginning of the buffer 232 as illustrated in FIG. 3(b), the T2 calculation unit 213 of the higher layer processing unit 21 obtains the clock time T2 as represented by Equation (2) below.

[Math. 2]

$$T2 = \frac{n' \cdot m + l}{\text{Throughput}} \quad (2)$$

Note that the decoding processing unit 222 detects the synchronization position 1 and notifies the T2 calculation unit 213 of the synchronization position 1. n'×m is the number of received bits from the reference clock time to reception of the REPORT frame. Equation (2) is used in a case in which the cycle of the uplink transfer unit 32 and the cycle of the downlink transfer unit 31 have the same reference clock time. In a case in which there is a specific time difference between the cycle of the uplink transfer unit 32 and the cycle of the downlink transfer unit 31, and the uplink and the downlink have different reference clock times, the decoding processing unit 222 adds the time difference between the reference clock times to the calculation result of Equation (2). Alternatively, the number of bits corresponding to the time difference may be added to the denominator of Equation (2).

After the T2 calculation unit 213 calculates the clock time T2, the RTT calculation unit 214 acquires the processing time T3 or the clock time T4 set by the ONU from the REPORT frame. The processing time T3 is a processing time from reception of the GATE frame by the ONU to transmission of the REPORT frame by the ONU. The clock time T4 is a clock time obtained by adding the processing time T3 to the clock time T1 set in the GATE frame. Note that in a case in which the processing time T3 is acquired from the REPORT frame, the frame generation unit 212 may not set the clock time T1 in the GATE frame. The RTT calculation unit 214 calculates RRT=T2−T4=T2−T1−T3 similarly to the method in the related art. Note that the RTT is represented by Equation (3) below. Thus, the RTT calculation unit 214 may calculate the RTT by Equation (3) below.

[Math. 3]

$$RTT = \frac{(n' - n) \cdot m + l}{\text{Throughput}} - T3 \quad (3)$$

Figure 4:
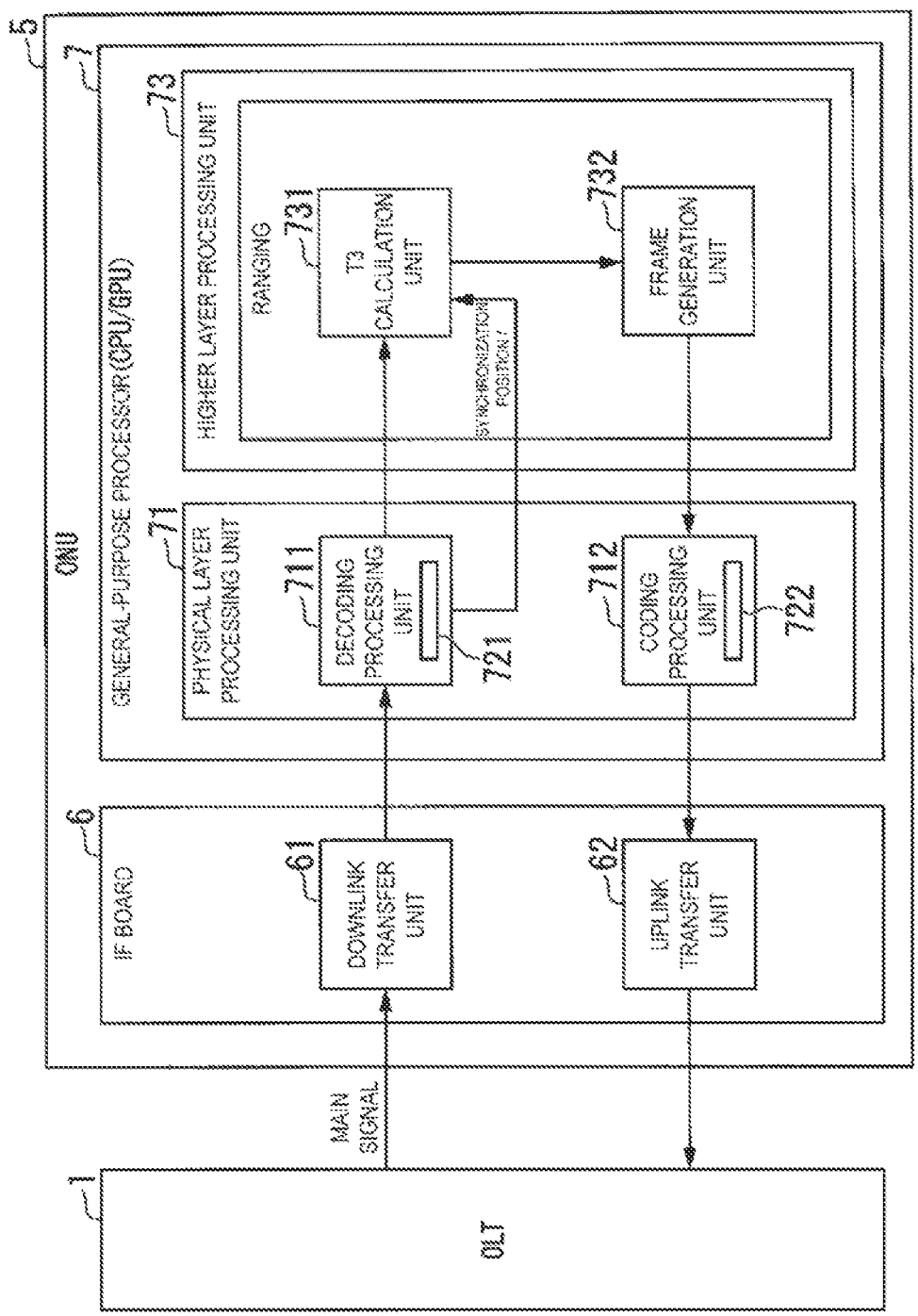
FIG. 4 is a functional block diagram of an ONU according to the embodiment.

Next, a configuration and processing of the ONU configured to perform ranging processing using software will be described. FIG. 4 is a block diagram illustrating a configuration of the ONU 5 according to this embodiment. The ONU 5 includes an IF board 6 and a general-purpose processor 7.

The IF board 6 is a hardware data communication unit. The IF board 6 has a downlink transfer unit 61 and an uplink transfer unit 62. The downlink transfer unit 61 periodically receives a downlink optical signal, converts the optical signal into an electric signal, and transfers the electric signal to the general-purpose processor 7 in a time period in which the OLT 1 performs downlink communication. The uplink transfer unit 62 converts the uplink signal frame generated by the general-purpose processor 7 from an electric signal to an optical signal and periodically transfers the optical signal to the OLT 1 in a time period in which the ONU 5 performs uplink communication.

The general-purpose processor 7 is a CPU, a GPU, or the like. The general-purpose processor 7 realizes functions of the physical layer processing unit 71 and the higher layer processing unit 73 using software.

The physical layer processing unit 71 has a decoding processing unit 711 and a coding processing unit 712. The decoding processing unit 711 performs decoding processing on downlink signal data transferred from the downlink transfer unit 61. The decoding processing unit 711 has a buffer 721 configured to temporarily store data that is a target of decoding. Note that the buffer 721 may be included outside the decoding processing unit 711. The coding processing unit 712 has a buffer 722 configured to temporarily store an uplink signal frame. The coding processing unit 712 performs coding processing on the uplink signal frame generated by the higher layer processing unit 73 and outputs the uplink signal frame to the uplink transfer unit 62. The coding processing unit 712 has a buffer 722 configured to temporarily store an uplink signal frame. Note that the buffer 722 may be included outside the coding processing unit 712.

The higher layer processing unit 73 has a T3 calculation unit 731 and a frame generation unit 732. The T3 calculation unit 731 calculates a processing time T3 in the ONU 5. The processing time T3 is a time required for the processing from reception of the GATE frame to transmission of the REPORT frame. The frame generation unit 732 generates a REPORT frame in which the processing time T3 calculated by the T3 calculation unit 731 is set and outputs the REPORT frame to the coding processing unit 712.

Figure 5:
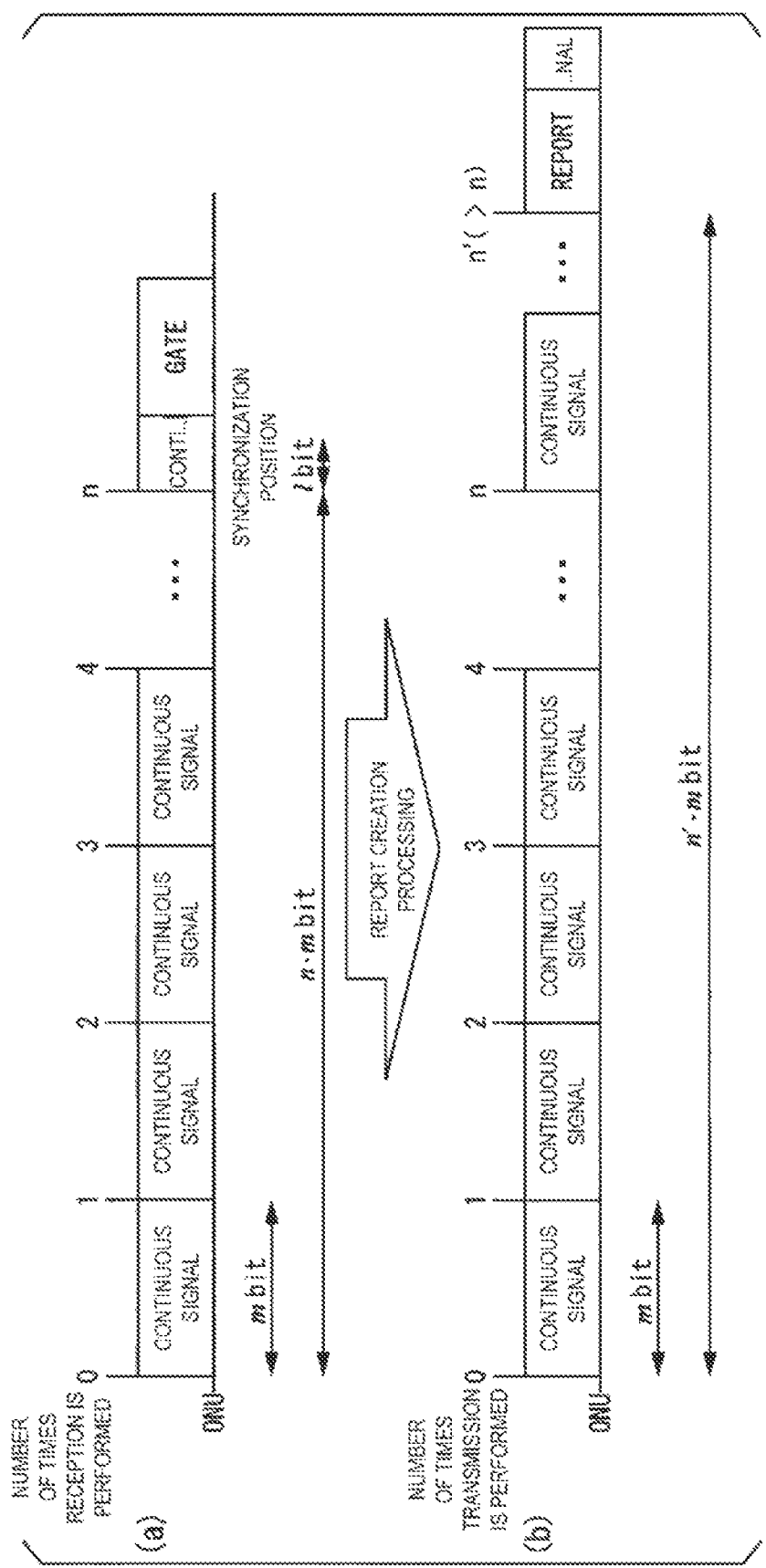
FIG. 5 is a diagram illustrating a state of a buffer in the ONU according to the embodiment.
Figure 6:
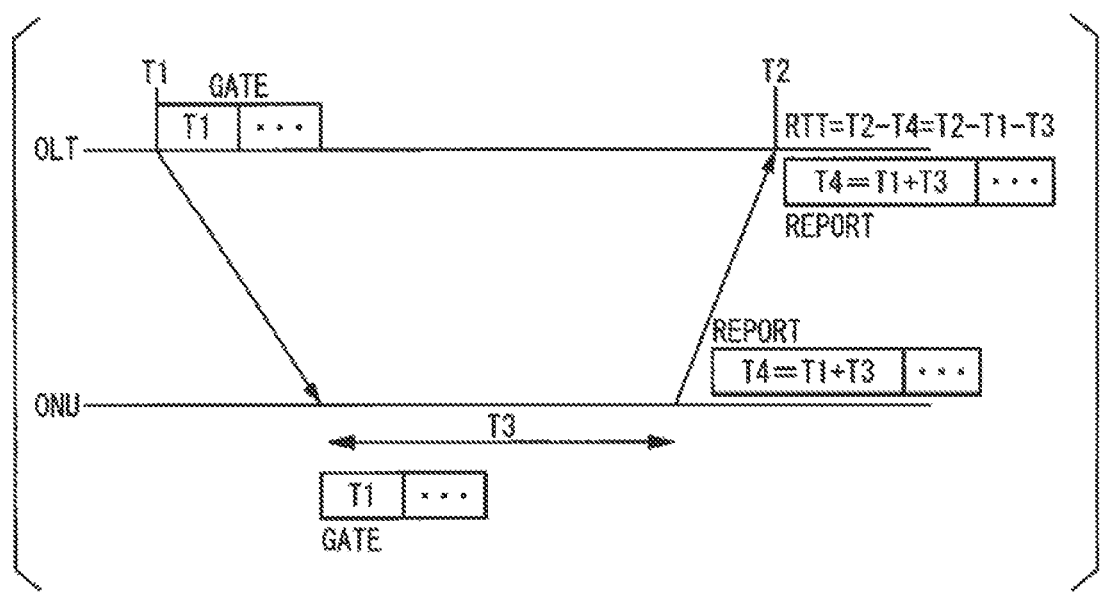
FIG. 6 is a diagram illustrating a ranging method according to the related art.
Figure 7:
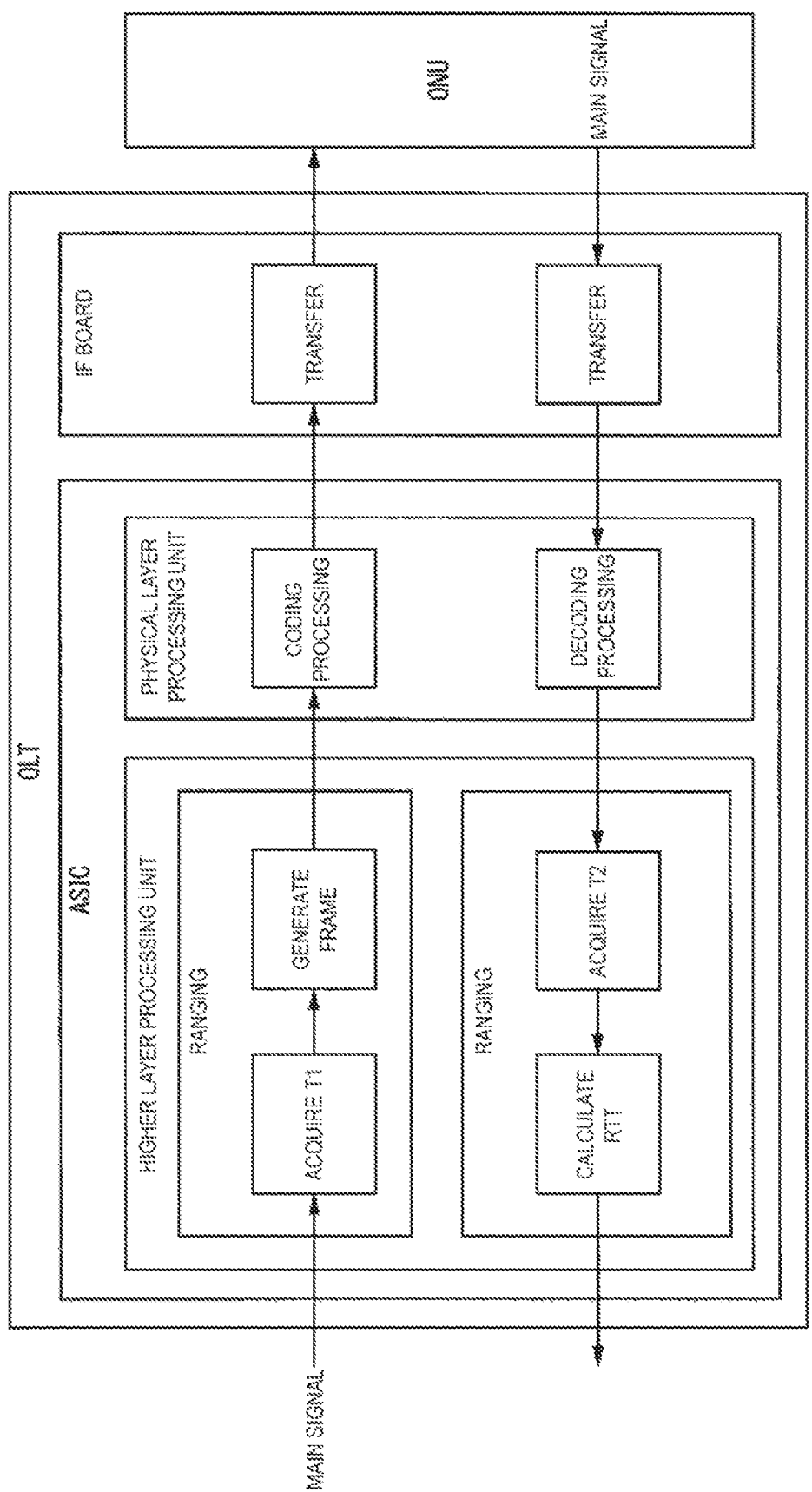
FIG. 7 is a functional block diagram illustrating a configuration of an OLT adapted to perform ranging according to the related art.

FIG. 5 is a diagram illustrating states of the buffers 721 and 722 when the ONU 5 generates the REPORT frame after the ONU 5 receives the GATE frame. FIG. 5(a) illustrates downlink signal data (continuous signal) stored in the buffer 721, and FIG. 5(b) illustrates uplink signal data (continuous signal) stored in the buffer 722. Note that new data is successively written in the buffers 721 and 722.

The downlink transfer unit 61 of the ONU 5 receives the downlink optical signal from the OLT 1, converts the downlink optical signal into an electric signal, and transfers the electric signal to the general-purpose processor 7. The decoding processing unit 711 writes the data transferred from the downlink transfer unit 61 in the buffer 721 and performs decoding processing thereon. The decoding processing unit 711 detects the GATE frame in the continuous signal reception at the n-th iteration of the cycle from a reference clock time (timing) time. The decoding processing unit 711 outputs, to the T3 calculation 731, the decoded GATE frame, the number n of the transfer cycle at which the GATE frame is received, and the synchronization position 1 that is a deviation from the position of the beginning of the transfer cycle when the gate frame is received. The T3 calculation 731 calculates the processing time T3 by Equation (4) below in a case in which the GATE frame is received at the n-th iteration of the transfer cycle and the REPORT frame is then output at the beginning of the transfer cycle corresponding to the n'-th transmission.

[Math. 4]

$$T3 = \frac{(n' - n) \cdot m - l}{\text{Throughput}} \quad (4)$$

In a case in which there is a specific time difference between the cycle of the downlink transfer unit 61 and the cycle of the uplink transfer unit 62 and the downlink and the uplink have different reference clock times, the T3 calculation 731 adds the time difference between the reference clock times to the calculation result of Equation (4). Thereafter, the frame generation unit 732 generates the REPORT frame to which the processing time T3 is appended and outputs the REPORT frame to the physical layer processing unit 71. Alternatively, the frame generation unit 732 generates the REPORT frame to which the clock time T4 obtained by adding the processing time T3 to the clock time T1 acquired from the GATE frame is appended and outputs the REPORT frame to the physical layer processing unit 71. The coding processing unit 712 of the physical layer processing unit 71 performs coding processing on the generated REPORT frame. The uplink transfer unit 62 converts the REPORT frame into an optical signal and transfers the optical signal to the OLT 1 at the beginning of the n'-th iteration of the transfer cycle.

As described above, the OLT 1 according to the present embodiment transmits and receives optical signals under hardware control and acquires T1 and T2 through arithmetic operations using software without acquiring a clock time directly from a clock, using the number of interruptions of the CPU by hardware at a specific cycle. Also, the ONU 5 transmits and receives optical signals under hardware control and acquires T3 through an arithmetic operation using software without acquiring a clock time directly from a clock, using the number of interruptions of the CPU by hardware at a specific cycle. It is thus possible to implement the ranging processing using software.

According to the aforementioned embodiment, the communication device includes a transmission timing calculation unit, a transmission unit, a reception unit, a reception timing calculation unit, and a round trip time calculation unit. The transmission timing calculation unit calculates a transmission timing of a first frame using the number of transferred bits from a predetermined timing to transmission of the first frame and a throughput in the communication device itself.

For example, the transmission timing calculation unit is a T1 calculation unit 211, and the first frame is a GATE frame. The transmission unit transmits the first frame generated by the frame generation unit to the external device at the transmission timing. For example, the first transmission unit is the downlink transfer unit 31, and the external device is the ONU. The reception unit receives a second frame from the external device in response to the first frame transmitted by the transmission unit. For example, the reception unit is the uplink transfer unit 32, and the second frame is the REPORT frame. The reception timing calculation unit calculates a reception timing of the second frame using the number of received bits from a predetermined timing to reception of the second frame by the reception unit and a throughput. For example, the reception timing calculation unit is the T2 calculation unit 213. The round trip time calculation unit calculates a round trip time of the external device using the processing time required by the external device from the reception of the first frame to the transmission of the second frame, the transmission timing calculated by the transmission timing calculation unit, and the reception timing calculated by the reception timing calculation unit. For example, the round trip time calculation unit is the RTT calculation unit 214.

The communication device may further include a frame generation unit configured to generate the first frame in which the transmission timing calculated by the transmission timing calculation unit is set. For example, the frame generation unit is the frame generation unit 212. Also, the round trip time calculation unit may acquire the processing time in the external device from the second frame or may acquire a result obtained by adding the processing time in the external device to the transmission timing.

According to the embodiment, the communication device such as an OLT calculates a transmission clock time of data transmitted from the device itself using the number of transferred bits from a certain timing and a throughput of the device itself, inserts the calculated transmission clock time to the frame in which the data is set, and outputs the frame to the transmission path. Also, the communication device calculates a reception clock time of received data using the number of received bits from a certain timing and a throughput of the device itself. The communication device can measure the round trip time with high precision using the calculated transmission clock time and reception clock time.

Also, according to the aforementioned embodiment, the communication device includes the processor and the interface circuit. For example, the communication device is the OLT 1, the processor is the general-purpose processor 2, and the interface circuit is the IF board 3. The interface circuit transfers data output from the processor to the external device at the predetermined cycle and transfers data received from the external device at the predetermined cycle to the processor. The processor includes the transmission timing calculation unit, the frame generation unit, the buffer, the reception timing calculation unit, and the round trip time calculation unit. The transmission timing calculation unit calculates the transmission timing of the first frame using the number of iterations of the cycle from the predetermined timing to the transmission of the first frame. The frame generation unit generates the first frame and outputs the first frame to the interface circuit. The buffer stores data received by the interface circuit at the predetermined cycle. The reception timing calculation unit calculates a reception timing of the second frame using the number of iterations of the cycle from the predetermined timing to reception of the second frame by the interface circuit, the second frame being transmitted from the external device in response to the first frame, and a deviation from the position of the beginning of the cycle at which the second frame is received to the storing position of the second frame in the buffer. The round trip time calculation unit calculates the round trip time with respect to the external device using the processing time required by the external device from the reception of the first frame to the transmission of the second frame, the transmission timing calculated by the transmission timing calculation unit, and the reception timing calculated by the reception timing calculation unit.

According to the embodiment, the communication device such as a subscriber line terminal device (OLT) is configured of a general-purpose processor such as a CPU/GPU and an IF board configured to transfer an external signal to a server that is general-purpose hardware configuring the communication device, and the IF board that is hardware periodically transfers data processed by the general-purpose processor. The general-purpose processor calculates the clock time T1 at which the GATE frame is transferred next time using the number of times transfer is performed and calculates the reception clock time T2 of the REPORT frame using the number of times the transfer is performed until the REPORT frame is received and a bit deviation from the beginning of the buffer to the position at which the frame is stored. The general-purpose processor can measure the round trip time with high precision using the calculated clock times T1 and T2.

Also, according to the aforementioned embodiment, the communication device includes the processor and the interface circuit. For example, the communication device is the ONU 5, the general-purpose processor is the general-purpose processor 7, and the interface circuit is the IF board 6. The interface circuit transfers data received from the external device at the predetermined cycle to the processor and transfers data output from the processor to the external device at the predetermined cycle. For example, the external device is the OLT 1.

The general-purpose processor includes a buffer, a processing time calculation unit, and a frame generation unit. The buffer calculates the processing time from the reception of the first frame to the transmission of the second frame using the number of iterations of the cycle from the predetermined timing to reception of the first frame by the interface circuit, a deviation from the position of the beginning of the cycle at which the first frame is received to the storing position of the first frame in the buffer, and the number of iterations of the cycle from the predetermined timing to the transmission of the second frame. The frame generation unit generates the second frame in response to the reception of the first frame and sets, for the generated second frame, the processing time calculated by the processing time calculation unit or a transmission timing of the second frame obtained by adding the calculated processing time to the transmission timing of the first frame read from the first frame and then outputs the second frame to the interface circuit.

In this manner, the communication device such as a subscriber line terminal device (ONU) is configured of a general processor such as a CPU/GPU and an IF board configured to transfer external signals to a server, and the IF board that is hardware has a transfer function of periodically transferring data processed by the general-purpose processor.

The general-purpose processor can calculate the processing time T3 until the REPORT frame is output after the processing of generating the frame with high precision from the reception of the GATE frame by the ONU using the number of times transfer performed until the GATE frame is received, the bit deviation from the beginning of the buffer to the position at which the GATE frame is stored, and the number of times the transfer performed until the REPORT frame is transmitted.

The embodiments of the present invention have been described above in detail with reference to the drawings. However, specific configurations are not limited to those embodiments, and include any design or the like within the scope not departing from the gist of the present invention.

INDUSTRIAL APPLICABILITY

The present invention can be applied to a device realizing a communication function using software.

REFERENCE SIGNS LIST

1 OLT
2, 7 General-purpose processor
3, 6 IF board
5 ONU
21 Higher layer processing unit
22 Physical layer processing unit
211 T1 calculation unit
212 Frame generation unit
213 T2 calculation unit
214 RTT calculation unit
221 Coding processing unit
222 Decoding processing unit
231, 232 Buffer
31 Downlink transfer unit
32 Uplink transfer unit

The invention claimed is:
1. A communication device comprising:
a processor; and
a storage medium having computer program instructions stored thereon, when executed by the processor, perform to:
calculate a transmission timing of a first frame using the number of transmitted bits from a predetermined timing to transmission of the first frame and a throughput of the communication device itself;
transmit the first frame to an external device at the transmission timing;
receive a second frame from the external device in response to the first frame transmitted by the transmission unit;
calculate a reception timing of the second frame using the number of received bits from a predetermined timing to reception of the second frame by the reception unit and the throughput; and
calculate a round trip time of the external device using a processing time required by the external device from the reception of the first frame to the transmission of the second frame, the transmission timing, and the reception timing.

2. The communication device according to claim 1, wherein the communication device is a subscriber line terminal device.

3. A ranging method comprising:
calculating a transmission timing of a first frame using the number of transmitted bits from a predetermined timing to transmission of the first frame and a throughput of the communication device itself;
transmitting the first frame to an external device at the transmission timing;
receiving a second frame from the external device in response to the first frame transmitted in the transmitting of the first frame;
calculating a reception timing of the second frame using the number of received bits from a predetermined timing to reception of the second frame in the receiving of the second frame and the throughput; and
calculating a round trip time of the external device using a processing time required by the external device from the reception of the first frame to the transmission of the second frame, the transmission timing, and the reception timing.

\* \* \* \* \*